United States Patent [19]

Graham

[11] 4,440,189

[45] Apr. 3, 1984

[54] CORROSIVE FLUID TWO WAY CHECK RELIEF VALVE

[76] Inventor: John M. Graham, 921 Sequoia Ave., Millbrae, Calif. 94030

[21] Appl. No.: 299,365

[22] Filed: Sep. 4, 1981

[51] Int. Cl.³ ............................................. F16K 17/18
[52] U.S. Cl. .................................. 137/116; 137/493; 137/508; 137/536
[58] Field of Search ................. 137/116, 493, 508, 536

[56] References Cited

U.S. PATENT DOCUMENTS

| | | | |
|---|---|---|---|
| 2,320,763 | 6/1943 | Trautman | 137/508 X |
| 2,681,074 | 6/1954 | Frentzel | 137/508 X |
| 3,123,092 | 3/1964 | Kmiecik | 137/536 X |
| 3,200,839 | 8/1965 | Gallagher | 137/536 X |
| 3,826,280 | 7/1974 | Perham | 137/508 X |
| 4,312,376 | 1/1982 | Allen | 137/536 |
| 4,317,467 | 3/1982 | Heyland | 137/493 |

FOREIGN PATENT DOCUMENTS

518482  2/1940  United Kingdom ............... 137/493

*Primary Examiner*—Robert G. Wilson
*Attorney, Agent, or Firm*—Townsend and Townsend

[57] ABSTRACT

A check relief valve particularly suited for use with corrosive fluids includes a body having an input port and an output port connecting a fluid passageway therebetween. A ring spring is mounted to the body along the fluid passageway. An annular sleeve is attached to the ring spring. A rod, having a sealing member at one end adapted to engage an annular edge of the sleeve, is lightly biased against the sleeve so that forward flowing fluid flows relatively unhindered while reverse fluid flow is checked. When the pressure at the output port is sufficiently greater than the pressure at the input port, the rod and moveable sleeve cause the ring spring to flex. After the rod has travelled a predetermined distance, movement of the rod is halted so that further movement of the sleeve breaks the seal with the sealing member to allow reverse flow of fluid. Also disclosed is a governor, which includes the check relief valve and pilot valve, for use between a pump, a system and a reservoir.

6 Claims, 3 Drawing Figures

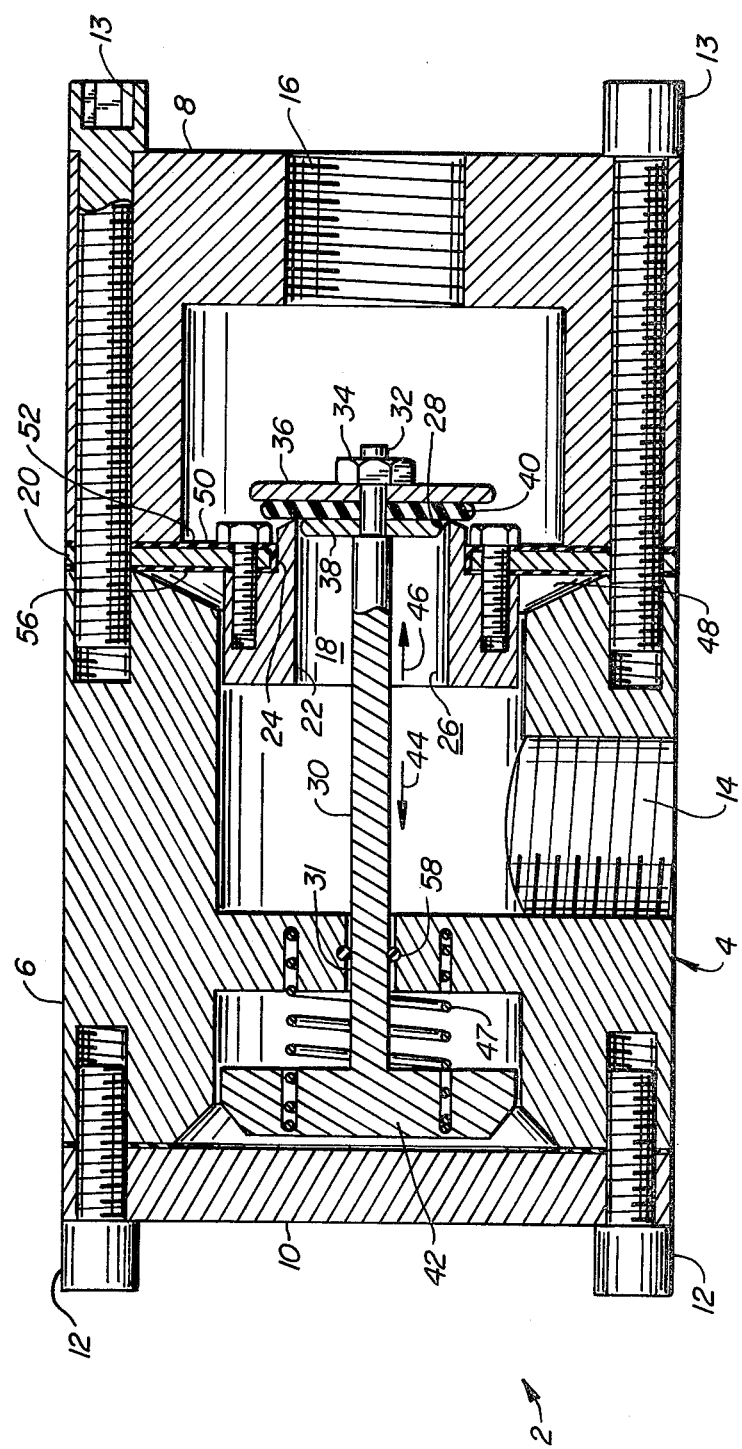
FIG._1.

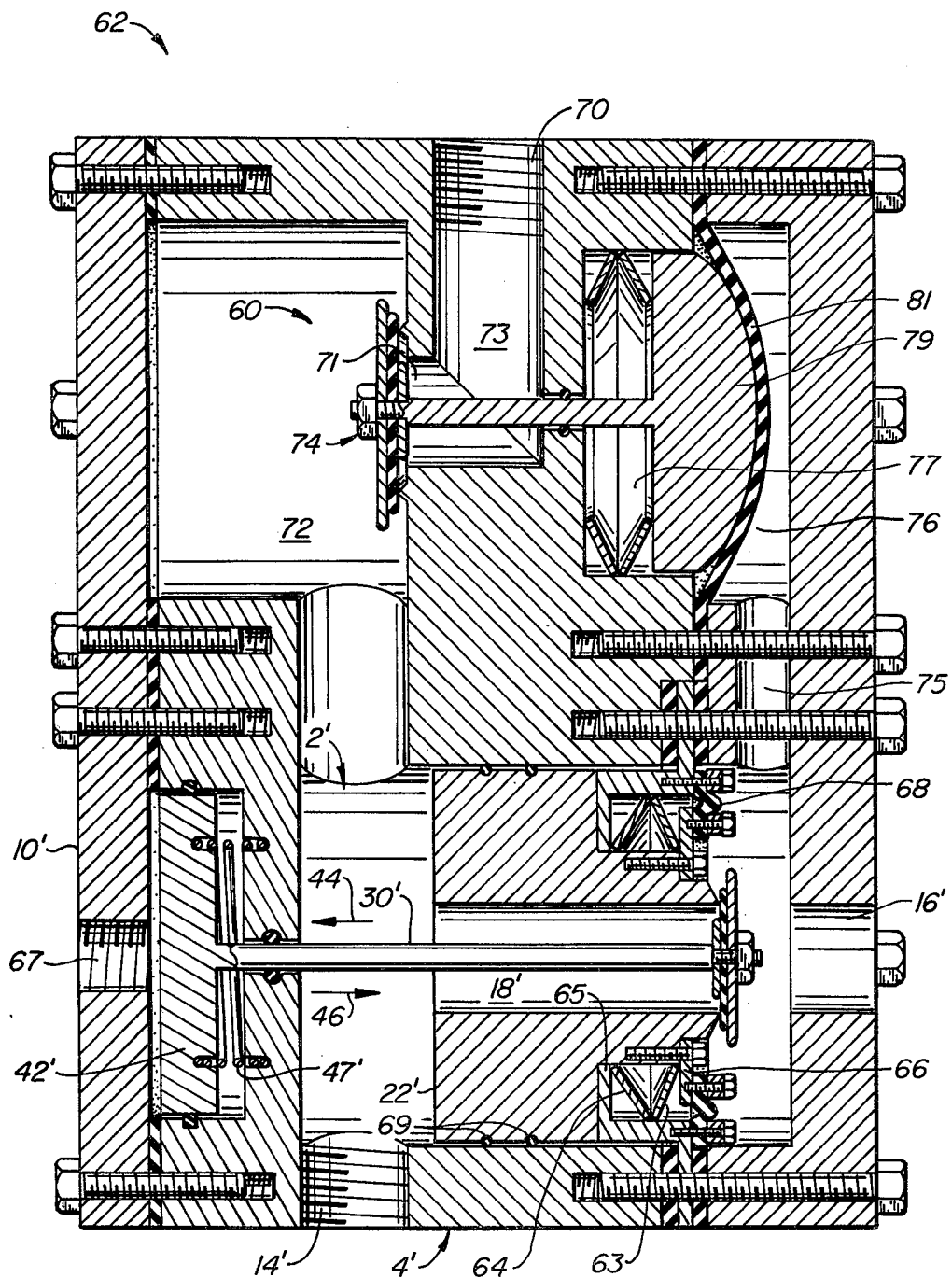
FIG._2.

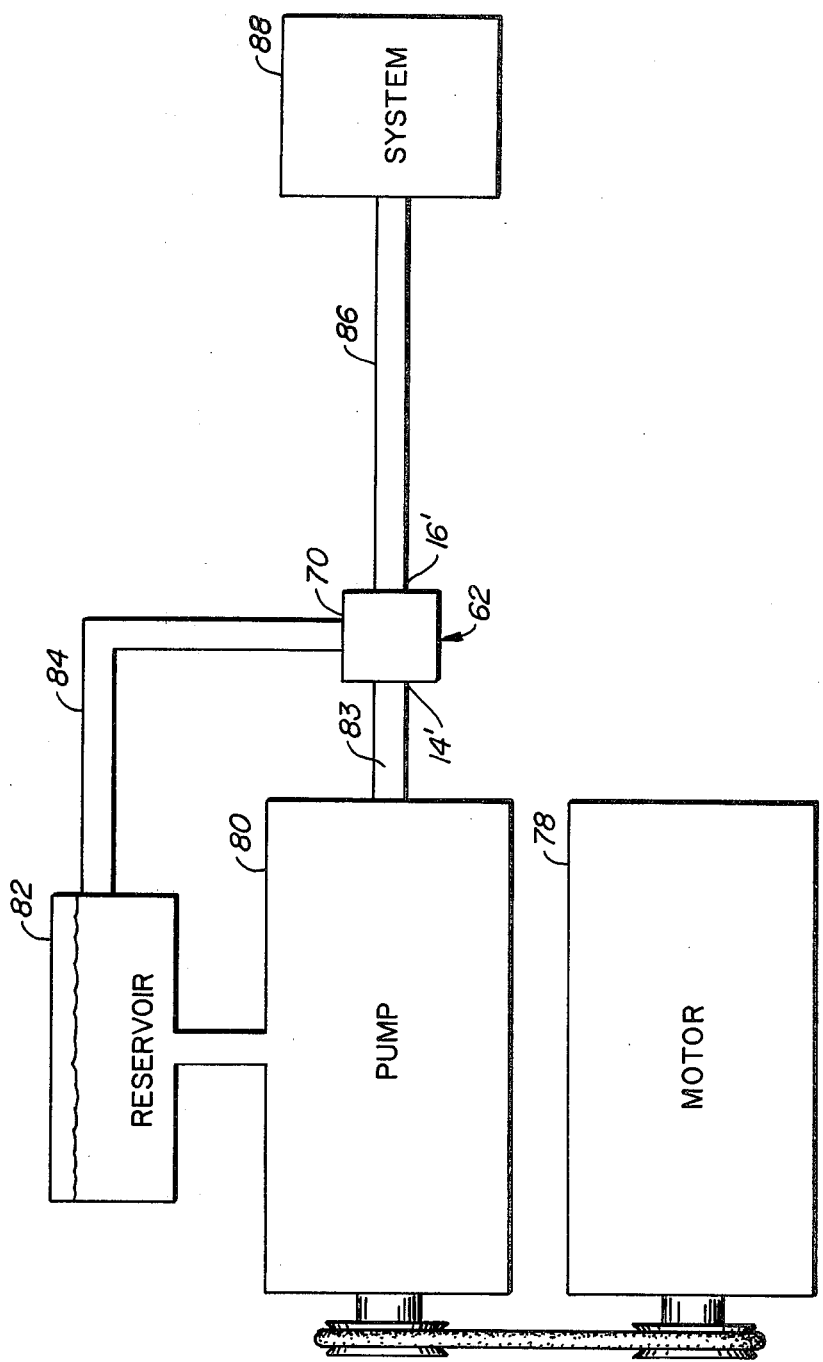
FIG._3.

_(4,440,189)_

CORROSIVE FLUID TWO WAY CHECK RELIEF VALVE

BACKGROUND OF THE INVENTION

1. Field of the Invention

This invention relates to valves, particularly a check relief valve suited for use with corrosive fluids.

2. Description of the Prior Art

There are numerous pressure regulators and unloading valves described in the art and generally available today. These prior art valves commonly display a particular structural feature; that is, the various valves usually use coiled springs mounted along the fluid pathway. For example, see U.S. Pat. Nos. 2,422,296 to Flader et al. and 2,622,611 to Stark.

One problem with using such springs is that they partially obstruct the passage of fluid between the input and output ports resulting in a pressure drop and lowered efficiency. Further, when corrosive fluids or fluids containing abrasive materials are used, the selection of the spring materials is restricted to ensure that the springs are not attacked by the corrosive fluids or worn down by the abrasives. The requirement that the spring material be chosen according to the corrosive or abrasive properties of the fluids passing through the valve can result in higher inventory costs because several types of springs must be stocked. The competing demands of cost and durability usually result in the choice of a spring material which is a compromise between the two.

Prior art pressure regulators and unloading valves also do not provide for the flow of fluid back from the system using the pressurized fluid when an overpressure in the system occurs. Typically pressure relief valves described in the prior art provide for the diversion of high pressure fluid from the pump to a reservoir when the system has reached a certain pressure. For example, see U.S. Pat. Nos. 2,342,001 to Magnuson and 2,680,447 to Groves. Although such valves may protect against overpressuring the system by the pump, they do not provide protection to the system from an overpressure emanating from the system itself.

SUMMARY OF THE INVENTION

A check relief valve particularly suited for use with corrosive fluids includes a body having an input port connected to a pump and an output port connected to a system and a fluid passageway therebetween. A circular ring spring is mounted to the body along the fluid passageway. A sleeve having an inner circumferential edge is mounted to the ring spring for movement along the fluid passageway when the ring spring flexes.

A rod is mounted to the body, extends along the fluid passageway and has a sealing member at one end for engaging the inner circumferential edge of the sleeve to seal the passageway. The rod is lightly biased in a reverse direction, that is from the output port to the input port, to force the sealing member against the sleeve so that the flow of fluids in a forward direction from the input port to the output port easily overcomes the bias of the spring and proceeds relatively unhindered while the reverse flow of fluid is halted by the engagement of the sealing member with the inner circumferential edge of the sleeve.

When the pressure at the output port is greater than the pressure at the input port by a certain amount, signifying an overpressure in the system, the rod and moveable sleeve move in the reverse direction against the biasing force of the ring spring. After the rod has travelled a certain distance in the reverse direction, the enlarged reverse end of the rod engages a stop halting further movement. Any further movement, resulting from the differential pressure between the output and input ports, occurs only by the sleeve moving against the biasing action of the ring spring to break the seal between the sealing member and the inner circumferential edge of the sleeve. Breaking such seal allows reverse flow of fluid through the fluid passageway to occur to relieve the overpressure condition in the system.

Also disclosed is a combination of the check relief valve described above and a pilot valve. The combination protects against overpressure caused by the pump as well as overpressure emanating from the system. The pilot valve includes a reservoir port, an input port and a pilot port. The input port of the check relief valve is fluidly connected via a bypass passageway to the reservoir port and the pilot port is fluidly connected to the output port. The check valve member of the pilot valve normally blocks fluid flow from the input port to the reservoir port. The valve member is actuated to open the bypass passageway in response to a second predetermined pressure at the output port. Typically, the second predetermined pressure is less than the first predetermined pressure and is equal to the desired operating pressure of the system; when the system pressure is also greater than the first predetermined pressure, flow of fluid occurs from the system and through the output port and either back through the input port towards the pump or through the bypass passageway and out the reservoir port. An override port allows pressurization of the volume between the stop and the enlarged reverse end of the rod to force the rod in the forward direction to allow free flow of fluid along the passageway in either direction.

A primary advantage of the present invention results from the provision of a check relief valve in which all spring elements are located outside of the fluid passageway to provide a relatively efficient, unobstructed flow path for the fluid. This is accomplished primarily by the provision of the ring spring to which the moveable sleeve is mounted. Turbulence and the resulting fluid drag is reduced so that effiency is enhanced.

The removal of spring elements from the fluid passageway also reduces the problems of corrosion and abrasion of the springs caused by caustic or abrasive fluids. The ring spring can be easily shielded from any contact with the fluid in the valve to effectively eliminate its deterioration which could result from contact with the fluid.

Other features and advantages of the present invention will appear from the following description in which the preferred embodiments have been set forth in detail in conjunction with the accompanying drawings.

BRIEF DESCRIPTION OF THE DRAWINGS

FIG. 1 is a cross-sectional view of a check relief valve made according to the present invention.

FIG. 2 is a cross-sectional view of an alternative embodiment of the valve of FIG. 1 coupled to a pilot valve for use as a governor.

FIG. 3 is a schematic diagram showing the use of the governor of FIG. 2 for passage of pressurized fluid to a system.

DETAILED DESCRIPTION OF THE PREFERRED EMBODIMENT

Referring to FIG. 1, the check relief valve 2 of the invention includes a body 4, having a main portion 6 and an end portion 8, and a cap 10. End portion 8 and cap 10 are mounted to main portiom 6 with screws 12, 13. Main portion 6 defines an input port 14 which fluidly communicates with an output port 16 in end portion 8 via a fluid passageway 18.

A flexible ring spring 20 is mounted along fluid passageway 18 between main portion 6 and end portion 8. A cylindrical, moveable sleeve 22 is mounted to spring 20 adjacent the inner circumference 24 of the ring spring. Sleeve 22 has a cylindrical inner surface 26 and an inner circumferential edge 28. A rod 30 is slidably mounted within a bore 31 in main portion 6 of body 4 and extends generally coaxially within inner surface 26 of sleeve 20. Mounted to the forward end 32 of rod 30 are a nut 34, a pair of stiffening washers 36, 38 and a sealing washer 40 captured therebetween.

The reverse end 42 of rod 30 is biased in a reverse direction 44 by a light coil spring 47 causing a seal to be formed between sealing washer 40 and inner circumferential edge 28. An O-ring 58 mounted in bore 31 prevents fluid in passageway 18 from contacting spring 47. Thus fluid flowing through input port 14 and along fluid passageway 18 forces rod 30 in a forward direction 46 allowing the fluid to flow between edge 28 and sealing washer 40 and out through output port 16.

When the pressure at output port 16 is greater than the pressure at input port 14, the fluid pressure on washers 36, 38 and flexible ring spring 20 causes spring 20 to flex in reverse direction 44. A portion 48 of main portion 6 is cut away to allow this flexure in reverse direction 44. Movement of rod 30 ceases when reverse end 42 contacts cap 10 so that any further flexure of spring 20 in reverse direction 44 results in edge 28 disengaging from sealing washer 40. This occurs when the pressure at output port 16 is sufficiently greater than the pressure at input port 14, such a condition designated as an overpressure at the output port, to allow reverse flow of fluid from the output port to the input port to eliminate the overpressure.

It should be noted that there are no springs or other such biasing members situated along fluid passageway 18 so that the passageway remains relatively unobstructed to increase the efficiency of the valve. Further, since spring 20 is not subjected to the flow of fluid directly past its surface, deterioration of spring 20 is reduced. Preferably a sealing diaphram 50 is mounted to cover the forward face 52, reverse face 56 and inner circumference 24 of spring 20 to shield the spring from the fluid. The relatively simple shape of ring spring 20 and its axial flection pattern allows it to be made of materials which may be unsuitable for use in coil springs. The cost of spring 20 therefore can be lowered compared with a suitable coil spring.

Turning now to FIG. 2, an alternative embodiment of the check relief valve of the present invention is shown used in conjunction with a pilot valve 60 to form a governor 62. The primary difference between the check relief valve 2 of FIG. 1 and check relief valve 2' of FIG. 2 is the use of a pair of Belleville springs 63, 64 in lieu of flexible ring springs 20. However, the general concept of using a spring in the form of a ring is the same regardless of whether a generally flat flexible ring spring 20 or angled Belleville springs 63, 64 are used. In either case a ring spring is mounted to the body and against which the sleeve is biased. In the embodiment of FIG. 2 a flat, stiff ring 66 is mounted to sleeve 22' and engages Belleville spring 63. Belleville springs 63, 64 are mounted within a cup-shaped mounting bracket 65 which is attached to body 41. A diaphram 68 flexibly couples ring 66 and spring mounting bracket 65 to seal springs 63, 64, along with O-rings 69, against the fluid in passageway 18'. Another distinction is the addition of an override port 67 in cap 10' opposite end 42'. This allows pressurization of the volume between cap 10' and end 42' to override spring 47' and open passageway 18'. Free flow of fluid in either direction can thus occur relatively unimpeded along passageway 18'.

A generally conventional pilot valve 60 fluidly couples input port 14' with a reservoir port 70 via a bypass passageway 72, a pilot valve inlet 71 and a pilot valve passageway 73. A check valve member 74 is mounted across passageway 73 to seal inlet 71 to normally block flow from input port 14' to reservoir port 70. Pilot valve 60 also includes a pilot port 76 fluidly coupled to output port 16' of check relief valve 2' by a passageway 75. Check valve member 74 is biased in a direction parallel to arrow 46 by springs 77 to seal inlet 71. Pressurized fluid within pilot port 76 presses against a diaphragm 81 covering an enlarged end 79 of valve member 74. When the pressure at output port 16' reaches a second predetermined value, check valve member 74 moves parallel to arrow 44 to unseal inlet 71 thus allowing the flow of fluid from input port 14' and passageway 18' through passageways 72 and 73 and out through reservoir port 70.

Turning also to FIG. 3, the operation of governor 62 will be described. It should be noted that in this exemplary use of governor 62, override port 67 is not used. A motor 78 drives a pump 80 to supply input port 14' with pressurized fluid from a reservoir 82 through a line 83. In normal operation fluid is transmitted to a sytem 88 via output port 16' and a line 86. The system can be any of a variety of devices or groups of devices which use pressurized fluid and for which it is desired to protect against overpressures in the system. When the pressure at output port 16' exceeds the second predetermined value, check valve member 74 unseals inlet 71 to fluidly connect input port 14' with reservoir port 70 allowing the pressurized fluid to flow substantially unimpeded from pump 80, through line 83, past port 14', through bypass passageway 72, past inlet 71, through passageway 73, past reservoir port 70, through a reservoir line 84 and to reservoir 82. When the first predetermined pressure at output port 16' is reached, which is generally higher than the second predetermined pressure, sleeve 22' compresses springs 64 until fluid is allowed to flow back through fluid passageway 18' and then out through input port 14' or reservoir port 70. Thus any overpressure developed by the pump or originating within the system is automatically released either to the reservoir or the pump whether the pump is operating or not.

Modification and variation can be made to the disclosed embodiments without departing from the subject of the invention as defined in the accompanying claims.

I claim:

1. A check relief valve useable with corrosive fluids comprising:
   a body;
   an input port formed in said body;
   an output port formed in said body;

a fluid passageway connecting said input and output ports; and a flow control means for controlling fluid flow along said fluid passageway, said flow control means adapted to permit substantially free flow of fluid in a forward flow direction, from said input port to said output port, along a control portion of said passageway and for blocking flow of fluid in a reverse flow direction, from said output port to said input port, along said control portion of said passageway, until a first predetermined pressure is reached at said output port, said flow control means comprising:

a ring spring;

means for mounting said ring spring to said body at said control portion of said passageway for axial flection generally parallel to said central portion of said fluid passageway;

a hollow member defining said central portion of said fluid passageway, said hollow member including a sealing surface circumscribing said central portion;

means for mounting said hollow member to said ring spring for limited movement within said body;

a movable seal configured to engage said sealing surface to block fluid passage from said output port to said inlet port;

means for urging said movable seal in said reverse flow direction towards said sealing surface, said urging means including a connection member having first and second ends, said second end connected to said movable seal;

said movable seal urging means including a spring, engaging said first end of said connection member, biasing said connection member in said reverse direction, said spring mounted to said body external of said passageway; and means for halting movement of said connection member in said reverse flow direction when said first predetermined pressure is reached at said output port thereby permitting fluid flow in said reverse flow direction.

2. The valve of claim 1 wherein said ring spring means includes a flat ring spring.

3. The valve of claim 1 further comprising means for shielding said ring spring means from the fluid.

4. The valve of claim 1 further comprising a pilot operated check valve including a pilot inlet fluidly coupled to the inlet port, a reservoir port fluidly connected to the pilot inlet, a normally closed valve means for blocking the flow of fluid from said inlet port to said reservoir port, a pilot port fluidly connected to said output port, and means for opening said normally closed blocking valve means when the pressure at said output port exceeds a second predetermined pressure to allow fluid to flow from said fluid passageway through said pilot inlet and out said reservoir port.

5. The valve of claim 4 wherein said second predetermined pressure is less than said first predetermined pressure.

6. A check valve comprising:

a body defining input and outout ports and a fluid passageway therebetween;

a valve member mounted along the passageway and having a first valve element defining a peripheral sealing surface through which a fluid flow can pass, a second valve element including a seal adapted to engage said sealing surface, and a spring, mounted external of said fluid passageway, operably connected to the second valve element to lightly bias said seal in a first direction toward said peripheral sealing surface to block fluid in a reverse direction from said output port to said input port;

a ring spring member having an inner circumference;

means for mounting said ring spring member along the fluid passageway of the body for passage of fluid through said inner circumference;

means for mounting said first valve element to said ring spring for movement parallel to said first direction; and means for limiting the movement of the second valve element in said first direction;

whereby reverse direction fluid flow is blocked by engagement of said seal with said sealing surface unless movement of the second valve element in the first direction is halted by said movement limiting means which occurs when the pressure at the output reaches a first level to permit reverse flow of fluid past the valve member.

* * * * *

UNITED STATES PATENT AND TRADEMARK OFFICE
CERTIFICATE OF CORRECTION

PATENT NO. : 4,440,189

DATED : April 3, 1984

INVENTOR(S) : John M. Graham

It is certified that error appears in the above-identified patent and that said Letters Patent is hereby corrected as shown below:

Column 6, line 18, delete "outout" and substitute --output--.

Signed and Sealed this

Twenty-eighth Day of August 1984

[SEAL]

Attest:

GERALD J. MOSSINGHOFF

Attesting Officer

Commissioner of Patents and Trademarks